No. 669,551. Patented Mar. 12, 1901.
S. L. RUTHERFORD.
SEWING MACHINE BACK CATCH.
(Application filed June 19, 1897.)
(No Model.)
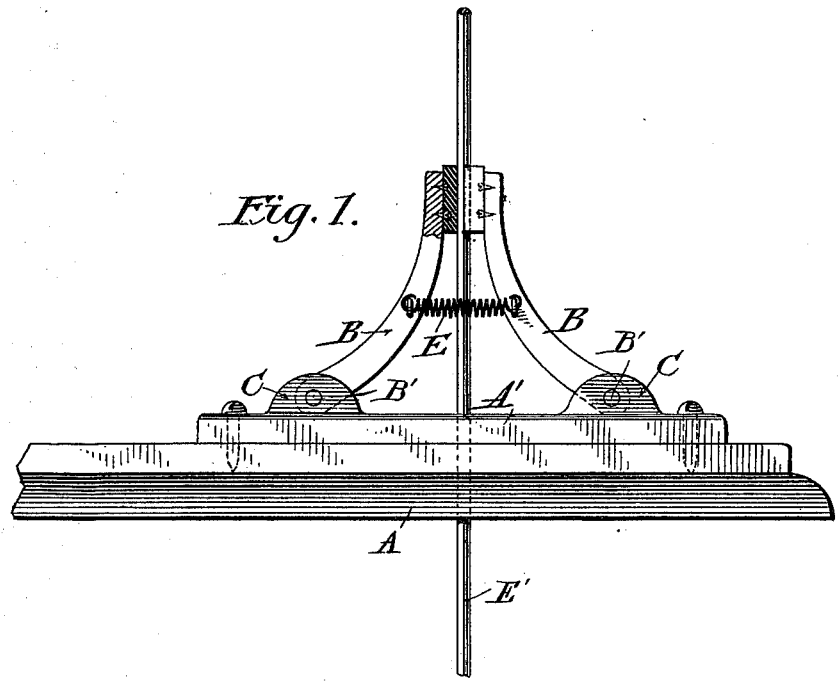
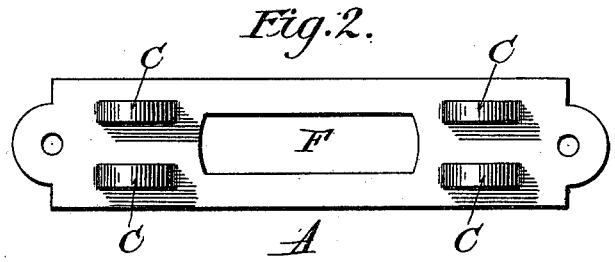
Witnesses
T. P. Britt
Chas. E. Brock
Inventor
Samuel L. Rutherford.
by O'Meara
Attorney

UNITED STATES PATENT OFFICE.

SAMUEL LUTHER RUTHERFORD, OF HIGHPOINT, TENNESSEE.

SEWING-MACHINE BACK-CATCH.

SPECIFICATION forming part of Letters Patent No. 669,551, dated March 12, 1901.

Application filed June 19, 1897. Serial No. 641,492. (No model.)

*To all whom it may concern:*

Be it known that I, SAMUEL LUTHER RUTHERFORD, residing at Highpoint, in the county of Knox and State of Tennessee, have invented a new and useful Sewing-Machine Back-Catch, of which the following is a specification.

This invention has relation to sewing-machines, and more particularly to an improved back-catch or brake therefor.

One object of the invention is to provide a brake for sewing-machines, so that when the belt is passing in an upward direction the movement thereof will not be interrupted; but should said movement be reversed and the belt accidentally move in a downward direction the movement thereof will be easily and quickly stopped.

Another object of the invention is to provide a brake or back-catch for sewing-machines, so that a machine that runs backward will be prevented from running forward, while the machine whose movement is in a forward direction will be prevented from moving in the opposite direction.

A further object of the invention is to provide a brake or back-catch for sewing-machines simple in construction and composed of a minimum number of durable and inexpensive parts.

With these and other objects in view my invention consists of certain novel features of construction and in combinations and arrangements of parts, that will be hereinafter more fully described and then specifically pointed out in the claim.

In order that my invention may be fully understood, I will proceed to describe the same with reference to the accompanying drawings, in which—

Figure 1 is a side elevation showing my invention in operative position. Fig. 2 is a top plan view of the securing plate or base.

The same letters of reference indicate like parts wherever they occur throughout both views.

In the practical embodiment of my invention I have shown an ordinary machine-table A, having secured thereto by means of suitable screws a base A', this base A' being provided with a chute or opening F for the passage of a belt E, which is adapted to extend through an opening of the machine-table and the chute or opening of the base A'. Secured on each side of the belt and preferably formed integral with the upper portion of the base A' are the two upwardly-extending ears C, adapted to serve as arm-rests for the reception of the curved arms B, said curved arms being riveted in the ears C, as shown at B'.

E indicates a coil or other spring, the free ends thereof being secured to the arms C, as shown, so as to hold said arms in the desired position and also to act as a guide for the belt E'. The upper portions of the arms B are arranged on either side of the belt, and the intervening spaces between the inner faces of said arms and the belt are intended to receive the rubber plugs D, the belt E being adapted to be freely slidable through the central portion of said rubber plugs. As the belt E' is moving in an upward direction and through the rubber plugs or blocks the arms B will be slightly spread apart by means of the spring E, secured to said arms, thereby permitting an easy upward movement of the belt through the rubber plugs or blocks. Should the belt, however, move in a downward direction, the rubber blocks or plugs will impinge against and adhere to the sides of the belt, thereby preventing any downward movement of the same.

From the foregoing description it will be seen that I have produced a very simple brake or back-catch for sewing-machines, whereby provision is made for the running of the belt in the proper direction, and that I also provide means whereby the backward or downward movement of said belt is guarded against and prevented in a very easy and simple manner.

The device herein described is composed of but a few parts, and should any of them become worn or broken they can be easily and quickly replaced by new ones.

By reason of the simplicity of the construction herein described it will be apparent that the brake can be applied in a very short space of time to any of the ordinary constructions of sewing-machines now generally used at a very slight cost.

It is evident that various slight changes might be made in the forms, constructions, and arrangements of the parts herein described without departing from the spirit and scope of my invention. Hence I do not care to limit myself to the exact construction herein set forth, but consider myself entitled to all such changes as might fall within the spirit and scope thereof.

Having thus described my invention, what I claim as new, and desire to secure by Letters Patent, is—

A sewing-machine-belt brake, consisting of a perforated base adapted to be secured to the top or bottom of the table at the belt-opening, a pair of converging arms pivotally secured to one side of the base at the ends of the opening, the free ends of the arms being provided with facing-pads of yielding material, and a spring connected at its ends with the arms intermediate their ends whereby the pads will be held loosely in contact with a belt to permit its running freely between them in one direction but adapted to engage therewith and prevent its passing between them in the opposite direction.

SAMUEL LUTHER RUTHERFORD.

Witnesses:
JAMES C. FORD,
LIZZIE GIFFIN.